United States Patent [19]

Zani

[11] 4,332,539
[45] Jun. 1, 1982

[54] PASTA MACHINE

[75] Inventor: Gian M. Zani, Domodossola, Italy

[73] Assignee: R. Bialetti & C. S.p.A., Omegna, Italy

[21] Appl. No.: 156,607

[22] Filed: Jun. 5, 1980

[30] Foreign Application Priority Data

Jun. 7, 1979 [IT] Italy ............................. 23335 A/79

[51] Int. Cl.³ .............................................. B01F 7/02
[52] U.S. Cl. .................................................. 425/151
[58] Field of Search ........................................ 425/151

[56] References Cited

U.S. PATENT DOCUMENTS 3,228,064 1/1966 Plummer ........................... 425/151
4,146,333 3/1979 Zani ..................................... 366/99

Primary Examiner—James R. Hall
Attorney, Agent, or Firm—Karl F. Ross

[57] ABSTRACT

A pasta machine has an L-shaped base formed with an extruder seat and provided internally with a gear transmission having an input projecting in one direction from the base, and mixer and extruder outputs projecting in the opposite direction. An extruder body has an extruder chamber provided internally with an auger and is formed with a window opening radially into the extruder chamber. A mixer body has a mixing chamber secured to the extruder body and communicating with the extruder chamber through the window. This mixer body is provided internally with a mixing rotor that extends along and is rotatable about a mixer axis parallel to the extruder axis, and with a lid engageable over and closing the mixer body. The extruder body can be releasably interfitted with the extruder seat so as to fit the auger with the extruder output of the transmission and to fit the rotor with the mixer output of the transmission.

16 Claims, 17 Drawing Figures 4,332,539

PASTA MACHINE

FIELD OF THE INVENTION

The present invention relates to a pasta machine. More particularly this invention concerns an apparatus of the type described in my earlier U.S. Pat. No. 4,146,333 for mixing and shaping pasta dough.

BACKGROUND OF THE INVENTION

Machines are known for mixing and shaping pasta dough into the various shapes pasta is marketed in. Such a machine has a mixing chamber provided with a rotor that can mix the ingredients of the pasta dough together until they have the desired consistency. Associated with this mixing chamber is an extruder having an extruder chamber provided with an auger that receives the dough once it reaches the proper consistency and forces it out of the extruder chamber through a die having orifices of the shape appropriate to form the desired type of noodles. Such an apparatus allows pasta to be produced which is widely recognized as being vastly superior to the store-bought type.

Nonetheless such devices have several principal disadvantages. First of all, the rotor is turned with considerable force, as the pasta dough cannot be mixed and kneaded easily, so that the user must be protected from contact with the radially extending arms of the rotor. This is most simply done in an electrically powered device by providing a normally open switch in series with the motor, which switch is only closed when contacted by the lid of the device in the closed position thereof. Such an arrangement works adequately with devices having built-in motors, yet is completely unusable in a manual pasta machine. Furthermore such devices normally make it impossible to add ingredients to the dough in the mixing chamber while the rotor is turning.

Such machines also normally have a slider or gate which can block a passage between the mixing and extruding chambers. If for some reason this gate is left open before the dough is fully blended, some of the ingredients will find their way into the extruding chamber so as not only to spoil the dough in the chamber by loss of part of the ingredients so that the ingredients ratio is incorrect, but also to create in the extruding chamber a mess that is difficult to clean.

Another considerable problem with the known pasta machines is that they are extremely difficult to clean. The mixing chamber and extruding chamber must normally be painstakingly rinsed and sponged out in order to remove all traces of the pasta dough after each use. This operation can be extremely difficult, in particular since the device frequently incorporates a relatively heavy transmission, and in powered devices an electric motor. What is more when partially disassembled some of the powered pasta machines can create considerable potential for injury as parts that can be rotated by the motor are exposed to the user's hands. In fact the difficulty of cleaning these machines is typically listed as one of their main drawbacks by users of them.

OBJECTS OF THE INVENTION

It is therefore an object of the present invention to provide an improved pasta machine.

Another object is to provide such a machine which is completely safe in operation, even when partially disassembled for cleaning.

A further object is to provide a pasta machine which is relatively easy to clean.

SUMMARY OF THE INVENTION

These objects are attained according to the instant invention in a pasta machine having a base formed with a seat and provided with a gear transmission that has an input projecting in one direction from the base, a mixer output exposed in the opposite direction, and an extruder output exposed also in the opposite direction, one of these outputs being provided at the seat. An extruder body has an elongated chamber provided internally with an auger element extending along and rotatable about an extruder axis. This body is formed with a window opening radially into the extruder chamber and with an axially open outlet. The mixer body has a mixing chamber secured to the extruder body and communicating with the extruder chamber through the window. The mixer body is provided internally with a mixing rotor element extending along and rotatable about a mixer axis generally parallel to the extruder axis and with a lid engageable over and closing the mixing body. One of the bodies is releasably interfittable with the seat with the respective element engaged with the one output and the other element with the other output. According to this invention the seat is an extruder seat and interfits with the extruder body and the one output is an extruder output interfittable with the auger element. The other output is a mixer output interfitting with the rotor element.

Thus the machine according to the instant invention can be disassembled and separated from the transmission-containing base for cleaning. Such an arrangement, which is altogether unknown in a pasta machine, therefore allows the dough-touching parts of the machine to be cleaned relatively easily. In fact according to this invention the extruder and mixing bodies can themselves be separable from each other for easy cleaning of these separate parts.

According to further features of this invention the lid is displaceable between an open position giving access to the interior of the mixing chamber and a closed position blocking such access. The machine comprises means for preventing the cover from moving from the closed into the open position when the one body is interfitted with the seat. This means includes a lever pivoted with one end on the lid and guided on the mixer body. The mixer body is formed at the mixer axis with a throughgoing hole through which the mixer output engages with the rotor element when the one body is fitted to the base. The lever extends in the open position of the lid across this hole and blocks it but is formed with a throughgoing hole aligned with the hole in the mixer body only in the closed position of the lid. Thus the device can only be assembled for engagement of the mixer output with the rotor element when the lid is closed. The lever according to this invention is L-shaped and has one leg formed with an elongated slot. A pivot pin fixed on the lid engages through this slot.

Thus with the system according to the instant invention it is impossible to assemble the device with the lid open. Only once the lid is closed, normally after the dry ingredients have been put into the mixing chamber, can the device be assembled so that the transmission can operate the rotor. This feature is particularly advantageous when combined with another feature of this invention, that is forming the lid with a pair of portions that define a narrow slot, these portions sloping downwardly toward the slot. Thus once the dry ingredients are added to the mixing chamber the apparatus can be assembled for blending them, and once they are blended the wet ingredients can easily be poured through the slot in the lid of the device, which slot is so narrow that the user cannot insert his or her fingers through it into contact with the rotor.

In accordance with another feature of this invention the gate that is provided between the bodies is formed with an aperture. This gate is displaceable between an open position with the aperture aligned with the window and a closed position with the aperture not aligned with the window and the gate blocking the window. A spring is provided for urging the gate into the closed position, so that it will normally be closed, and it will take a conscious effort by the user to open it. It is also possible to provide a rotary knob for locking the bodies to the base. This knob is rotatable through a predetermined angular position for locking and unlocking the bodies from each other. The gate and the knob are formed with interengaging formations that only permit the gate to be moved between its open and closed position in this predetermined angular position of the knob. Thus the gate can only be displaced from the closed to the open position when the knob is in this predetermined angular position, and can only be displaced back from the open into the closed position if the knob remains in or is returned to this angular position. Thus the user will normally have to rotate the knob into this position in order to open up the gate, and will have to rotate the knob a little further to hold the gate in the open position. Nonetheless when the knob is rotated to remove the extruder and mixer from the base, it will automatically pass through this angular position so that the spring will pull the gate back into the closed position. The user can therefore be assured, even without making a special effort, that the gate will be closed whenever the removable extruder and mixer have been taken off the base. The annoying accident of starting to mix and then realizing that the gate is open and the batch is spoiled is thus made impossible with the apparatus according to the instant invention.

The extruder and mixer according to this invention are formed of a transparent synthetic resin so that the user can easily watch what is going on inside the machine. This is particularly advantageous in the system according to this invention, as the lid remains closed when the dough is being kneaded in the mixing chamber. Thus it is possible for the user to determine exactly when the dough is ready for extrusion into noodles. A transparent synthetic resin such as polymethylmethacrylate can be relatively easily washed and has considerable physical strength.

BRIEF DESCRIPTION OF THE DRAWING

FIG. 1A is a view of a detail of FIG. 1 in another position;

SPECIFIC DESCRIPTION

Figure 1:
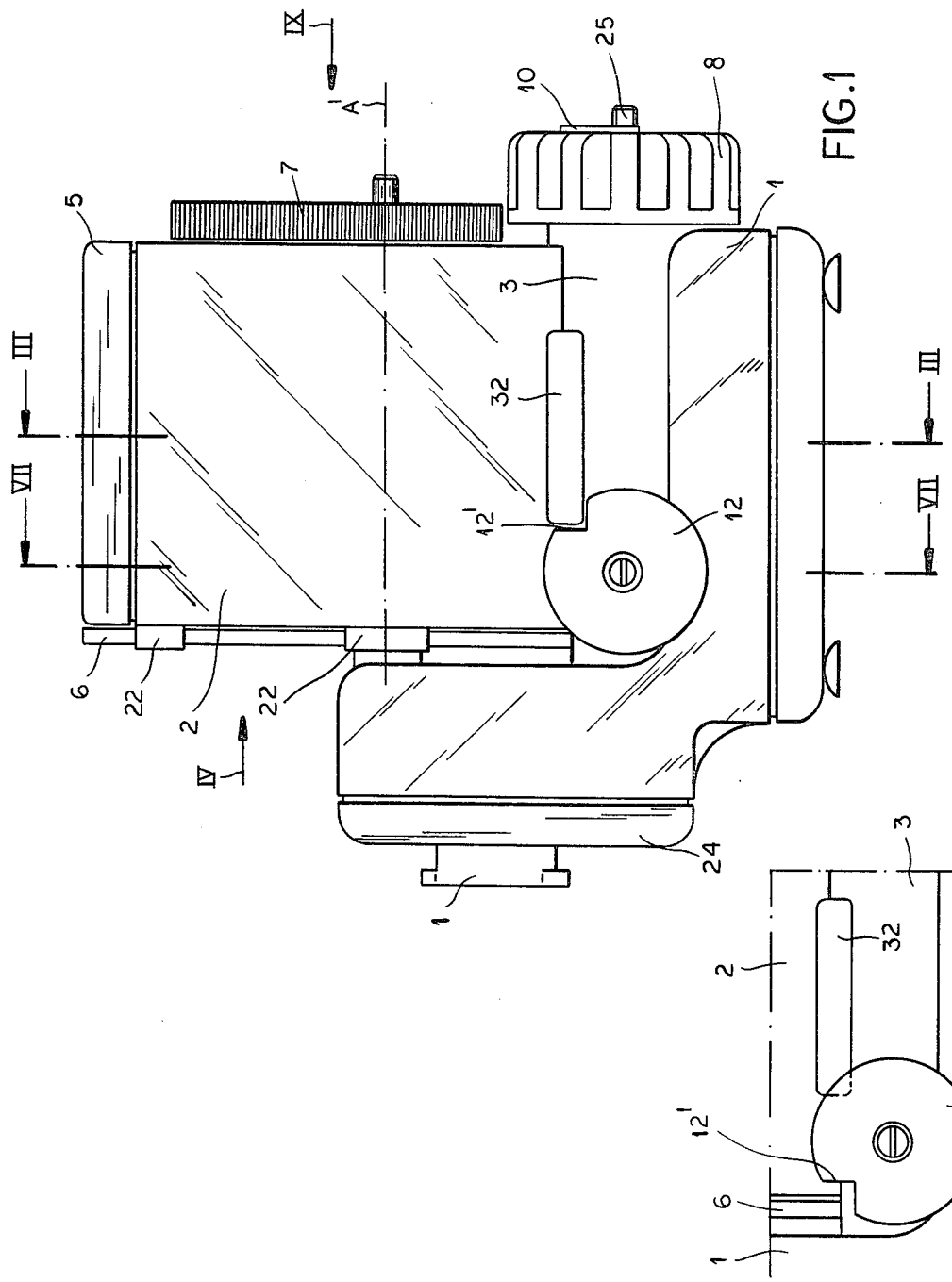
FIG. 1 is a side view of the entire machine according to the invention with its base or housing hopper or mixer and extruder.
Figure 2:
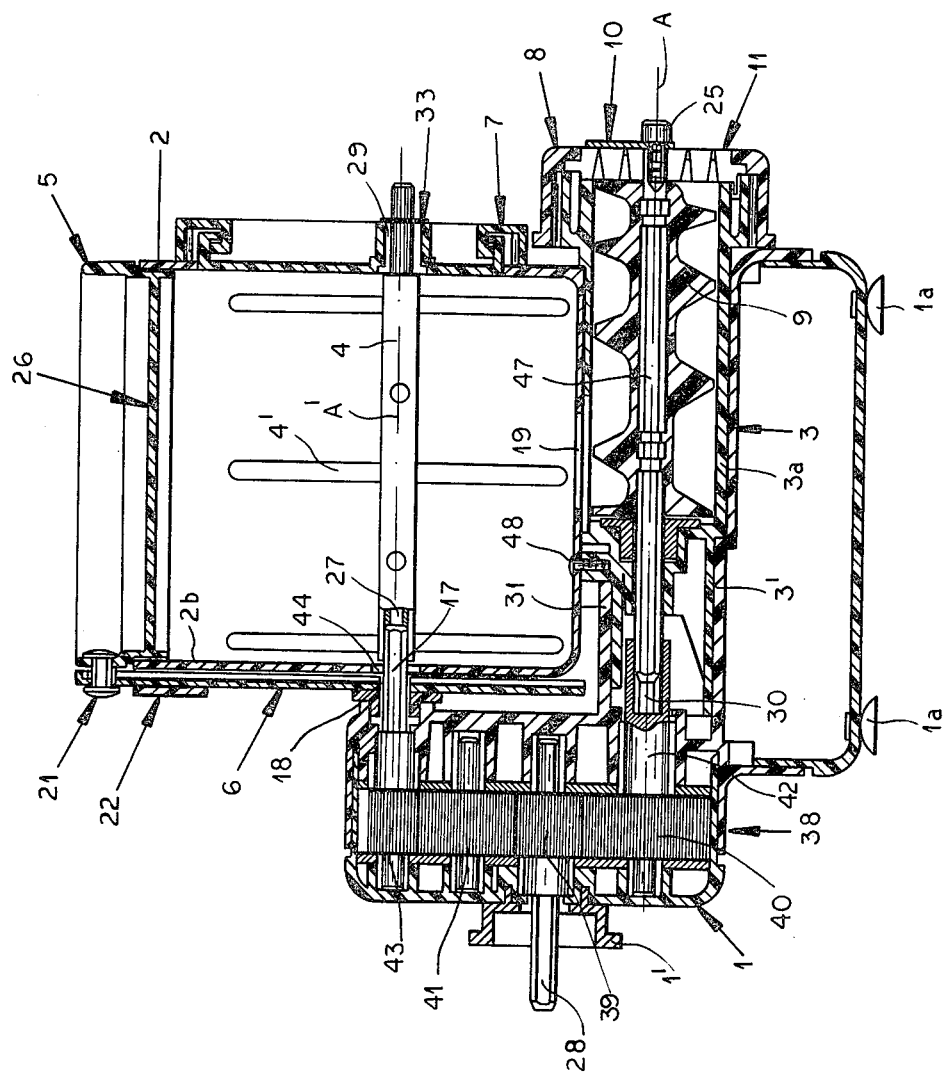
FIG. 2 is a vertical longitudinal section through the entire machine according to this invention.

The pasta machine according to the instant invention has three main parts: an L-shaped housing or base 1, a mixer or hopper 2, and an extruder 3. These parts can all be joined together as shown in FIGS. 1 and 2 or separated from each other as will become apparent below.

Figure 5A:
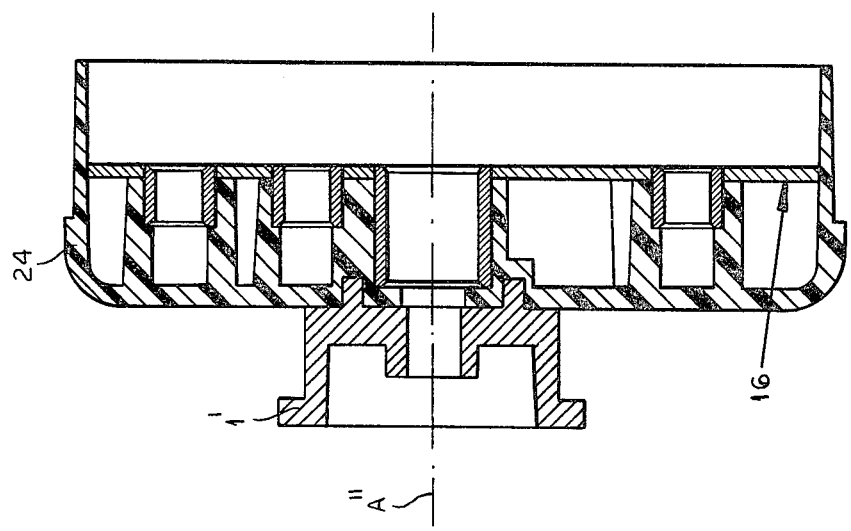
FIG. 5A is a section taken along line VA—VA of FIG. 5.
Figure 5:
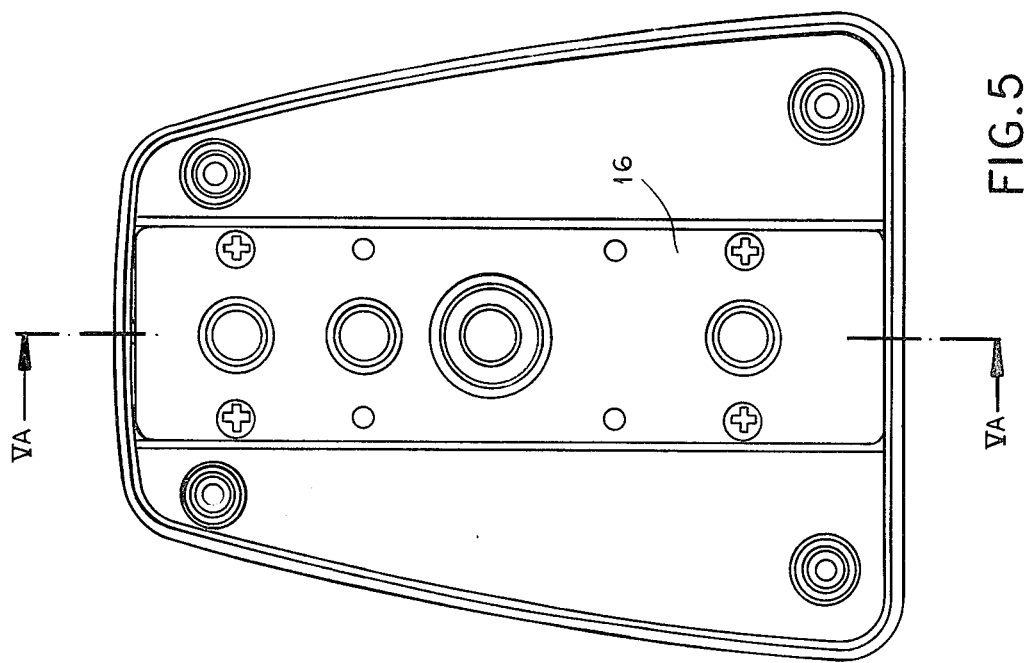
FIG. 5 is an end view of a portion of the housing according to this invention.

The housing 1 is formed mainly of a durable synthetic resin and has suction-cup feet 1a that allow it to stand in a stable manner on a counter or the like. In addition the housing 1 has an upright portion containing a transmission 38 constituted by a relatively small drive pinion 39 carried on an input shaft 28 and meshing with a pair of larger-diameter gears 40 and 41, the former of which carries an output shaft 42 formed with a polygonal seat 30 centered on an axis A and the latter of which meshes with yet another gear 43 carrying a polygonal output shaft 17 centered on an axis A'. These gears are carried on a plate 24 shown in FIGS. 5 and 5A that is provided with a reinforced metal plate 16 to ensure that they remain in perfect mesh. In addition this gear-carrying plate 24 has a recessed seat 1' centered on the axis A" of the input shaft 28. This seat 1' is intended to receive a crank handle or a motor unit for rotating the shaft 28 about the axis A" in a manner well known in the art. A motor unit that can also drive a meat grinder, blender, juicer, or other pasta machine may be used. The lower horizontal leg of the L-shaped housing 1 is formed with a D-section socket 31 adapted to receive a corresponding projection 3' of the extruder 3. The extruder output shaft 30 of the transmission 38 extends into this socket 31.

Figure 7:
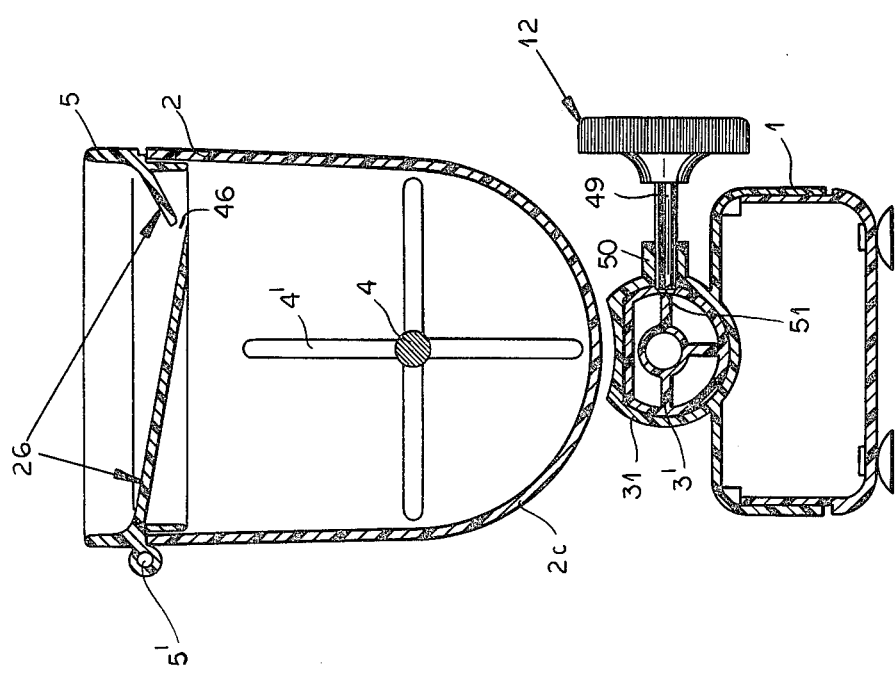
FIG. 7 is a vertical section taken along line VII—VII of FIG. 1.
Figure 8:
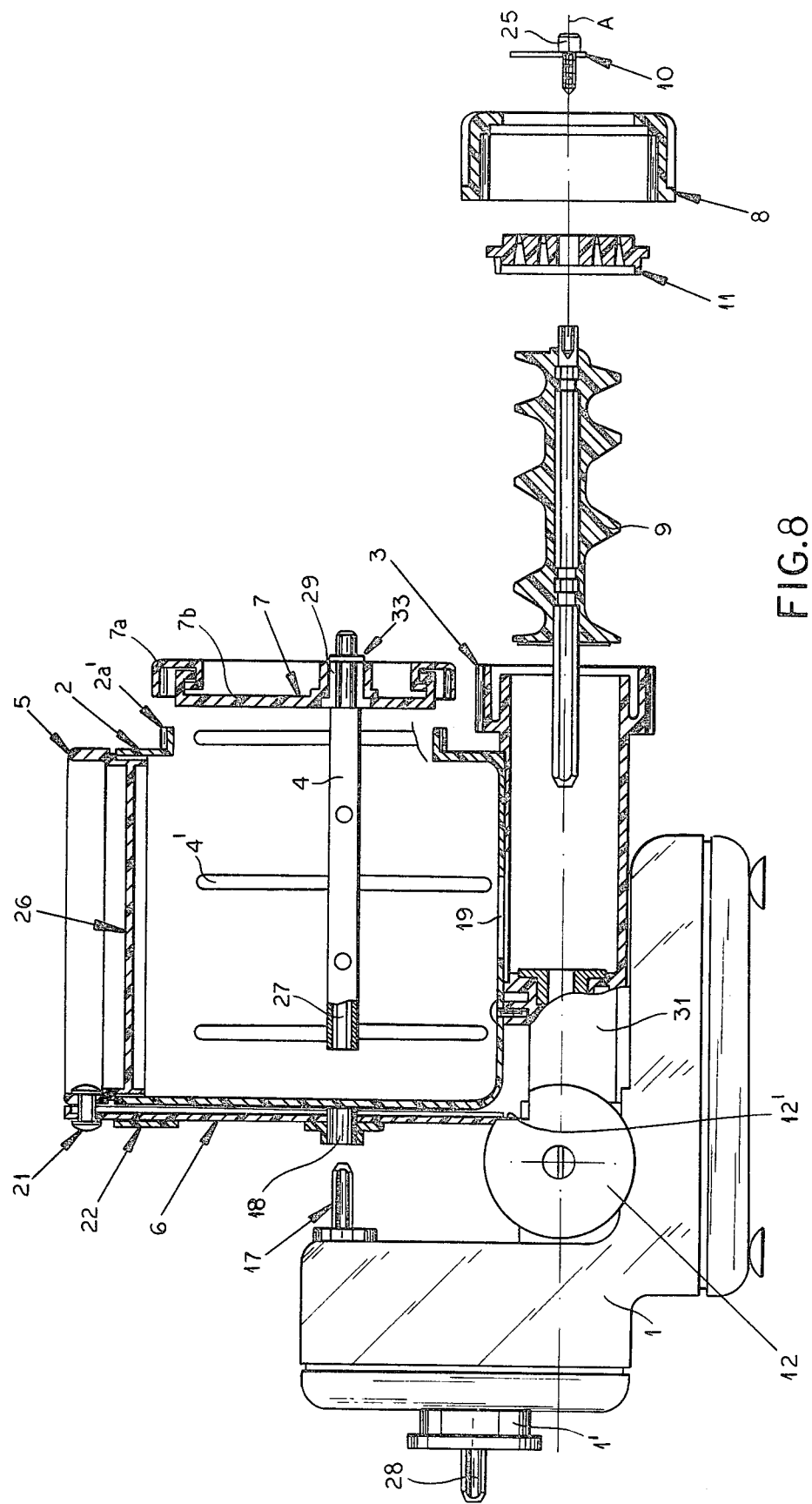
FIG. 8 is an exploded partly sectional view of the entire machine according to this invention.

The hopper 2 has a pair of end walls 2a and 2b and a U-shaped side wall 2c (FIG. 7) forming an upwardly open vessel with these end walls 2a and 2b, but formed at its lowermost region with a throughgoing hole or passage 19. The one wall 2b of the hopper 2 is pierced at 44 in line with the mixing output shaft 17 so it can project into the interior of the hopper 2. The other end wall 2a is provided with a self-lubricating journal 29 in which is received one end of a stainless-steel rotor shaft or arbor 4 provided with a multiplicity, here 10, of radially projecting synthetic-resin arms 4' which serve to mix ingredients and knead dough in the manner described in my earlier U.S. Pat. No. 4,146,333. In addition this end wall 2a is in part constituted as a removable cover 7 secured by means of screw threads 45 to the remaining portion of the wall 2a. The cover 7 is constituted as an outer ring 7a (FIGS. 8 and 9) and an inner disk 7b. The ring 7a is threaded on a collar 2a' of the wall 2a. The shaft 4 extends through the journal 29 and is provided with a snap ring 33 so that this shaft 4 will be axially nondisplaceable relative to the cover 7.

At its end turned away from the cover 7 the shaft 4 has a polygonal recess or seat 27 complementary to the shaft 17 and adapted to fit snugly thereover for rotary force transmission between this shaft 17 and the shaft 4.

Figure 3:
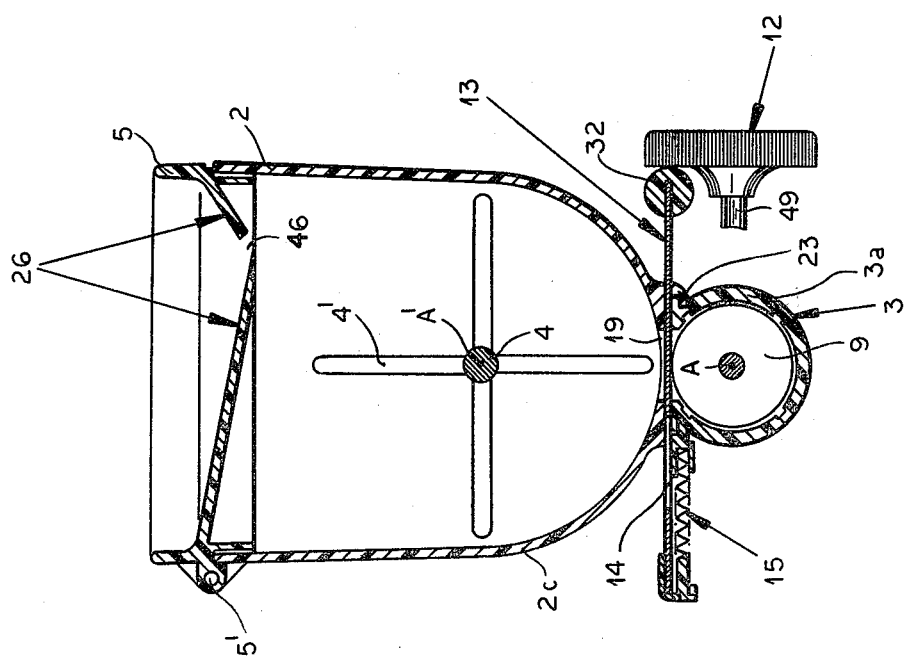
FIG. 3 is a section taken along line III—III of the mixer and extruder of the machine according to this invention.

The hopper 2 is provided with a lid 5 hinged, as seen in FIG. 3, at 5', at one edge of the wall 2c and formed with a pair of downwardly inclined wall portions 26 defining an inwardly open slot 46 offset horizontally from the axis A' and allowing liquid ingredients to be poured into the interior of the hopper 2, while making it impossible for a user to place his or her fingers into the hopper 2 through the opening 46.

Figure 4:
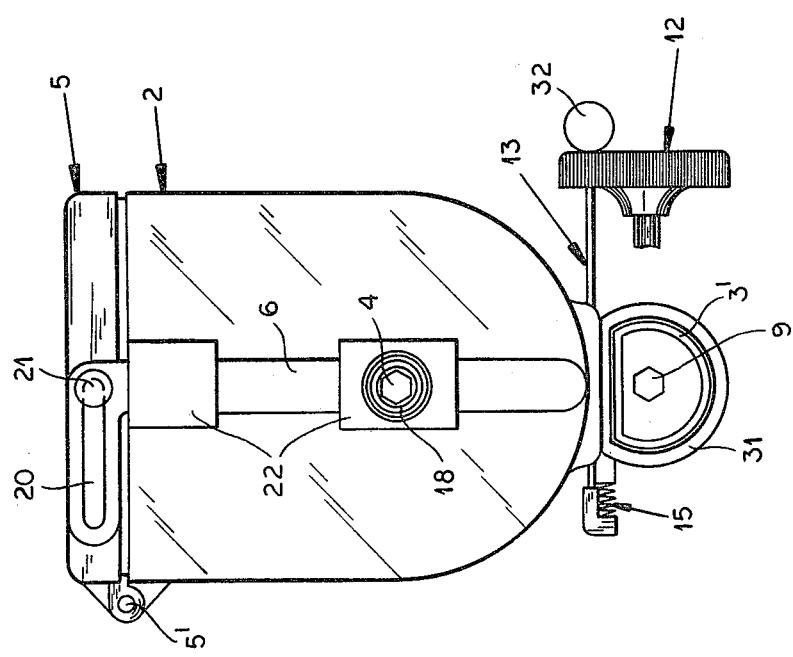
FIG. 4 is an end view taken in the direction of arrow IV of FIG. 1 of the mixer and extruder of the machine according to this invention.
Figure 4A:
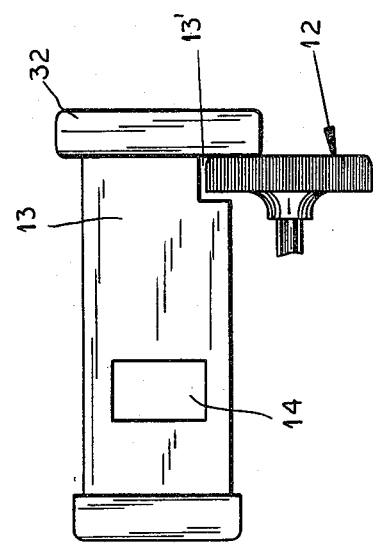
FIG. 4A is a top view of a detail of the machine according to this invention.
Figure 6:
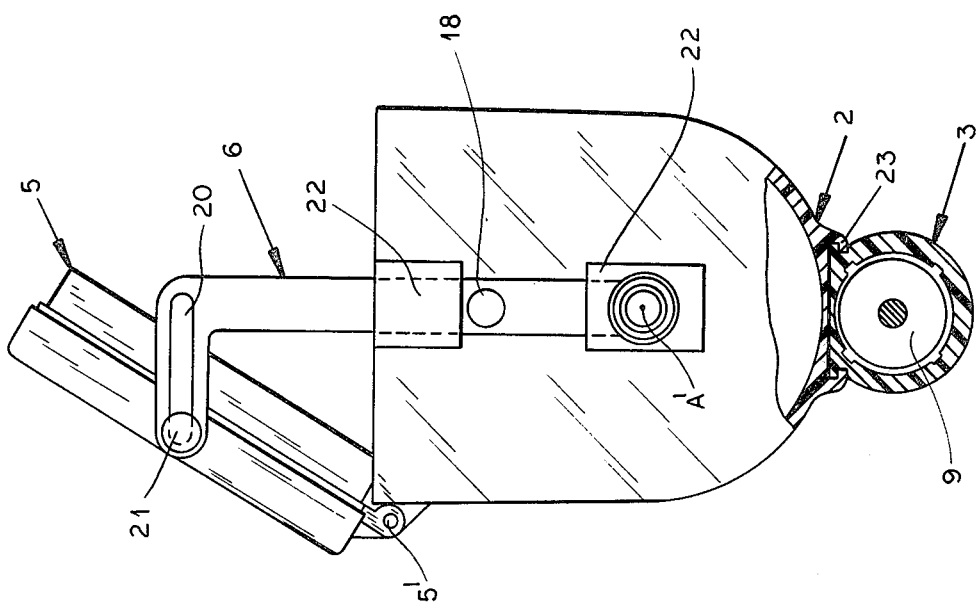
FIG. 6 is a partly sectional view similar to FIG. 4 but showing the mixer with its lid open.

Opening of this lid 5 during use of the machine is made impossible by a locking lever 6 best seen in FIGS. 4 and 6. This lever 6 is L-shaped and has a long vertical leg guided in a pair of guides 22, one of which is centered on the axis A'. This long vertical leg is also formed with a throughgoing hole 18 which can be aligned with the hole 44 of the end wall 2b. The other short horizontal leg of this L-shaped lever 6 is formed with a horizontal slot 20 in which engages and is slidable a pin 21 projecting axially from the enf of the lid 5. The lid 5 can move between the open position of FIG. 6 and the closed position of FIG. 4 with vertical sliding of the lever 6 so long as the shaft 17 is not engaged through the aligned holes 18 and 44. In addition the lower end of the lever 6 blocks the hole 44 when the lid 5 is in the open position of FIG. 6 so that it is impossible to mount the hopper 2 on the housing 1 unless its lid 5 is closed. When mounted on the housing 1 it is, also impossible to open the lid 5 as the lever 6 cannot slide in the guides 22. Thus standard practice is to load the bulky dry ingredients into the hopper 2 past the open lid 5 before mounting the hopper 2 on the housing 1, then to close the lid 5 and mount the assembly together.

The extruder 3 has a cylindrical wall 3a centered on the axis A and receiving an auger 9 carried on a polygonal shaft 47 projecting into the end portion 3' and receivable in the polygonal seat 30 of the output shaft 41 of the transmission 38. The end of the auger 9 turned away from the transmission 38 is juxtaposed with a perforated die 11 held on the end of the housing by a hand nut 8. A blade 10 is secured by means of a screw 25 to the end of this die 11 to orbit over the apertures thereof and cut off the pasta as it is extruded through it as will be described below. Normally the extruder 3 is secured by screws such as shown in 48 to the hopper 2, and both of these parts 2 and 3 are made almost entirely of a durable and heat-resistant synthetic resin that is transparent so that the user can view the contents thereof during use.

The window 19 at the lowermost portion of the hopper 2 can be blocked by a slider or gate 13 formed with an aperture or window 40 that can be aligned with the window 19. A spring 15 shown in FIGS. 3 and 4 normally pulls the gate or slider 13 into a position blocking the opening 19. A handle 32 at the outer end of this gate or slider 13 can be pulled to move it into a position with the apertures 13 and 19 aligned so that material inside the hopper 2 can make its way into the extruder 3. These two parts 2 and 3 are secured together by a T-connection 23 so that leakage from between them is almost entirely impossible.

The extruder 3 and, with it, the hopper 2 can be secured tightly in place on the housing 1 by means of a threaded shaft 49 carrying a large knob 12 and threaded into a nipple 50 formed on the portion 31 of the housing 1. The end of this threaded shaft 49 can engage in a recess 51 of the end 3' to lock these two parts and the associated structure tightly together.

In addition, as can be seen by a comparison of FIGS. 1 and 1A the knob 12 is formed with a cutout or notch 12' that can be aligned with the handle 32 to allow it to be pulled back to move the windows 13 and 19 into registration for flow of ingredients from the hopper 2 to the extruder 3, as shown in FIG. 1, but normally lies in a position as shown in FIG. 1A preventing such displacement and holding the window 19 closed. Only when the notch 12' is aligned with the handle 32 can this handle 32 be pulled out into the open position, that is the position with the windows 14 and 19 aligned. What is more the gate 13 is formed with a notch 13' that allows the knob 12 to be rotated back with the notch 12' out of alignment with the handle 32 when in the outer open position so as to lock the gate 13 in this open position.

In this manner the gate 13 will normally block the opening 19 and prevent any flow from the hopper 2. Only an intentional action, that of aligning the notch 12' with the handle 32, will allow the user to pull out the handle 32 and with it the gate 13 against the force of the spring 15 to open up the window 19. Once in this outer position a rotation of the handle 12 can lock the gate in the outer position for further processing, as will be described below. Nonetheless, in the event that the user disassembles the machine he or she will have to rotate the knob 12 to pull the shaft 49 out of the hole 51, and during such rotation the notch 12' will invariably align itself with the handle 32 and allow the spring 15 to pull the gate 13 back into the closed position. In this manner the user can be assured that, having removed the hopper 2 from the machine, the aperture 19 will be closed.

In use, the dry ingredients are normally loaded into the hopper 2 while this hopper 2 is not mounted on the housing 1, so that these ingredients can be loaded in with the lid 5 open. Thereupon the user slides the hopper 2 onto the housing 1, fitting together the complementary formations 31 and 3' and simultaneously fitting the shafts 17 and 47 into the respective seats 27 and 30. The knob 12 is then rotated to lock the assembly tightly together.

Thereupon the drive can be actuated either by mounting a crank on the input shaft 28 and manually turning the transmission 38, so that the auger 9 and rotor assembly 4, 4' counterrotate, or by attaching a motor unit to the shaft 28. In any case this will blend the dry ingredients effectively.

The wet ingredients can then be poured in through the slot 46 so that the rotor arms 4' will mix these ingredients together to form a dough. The dough is normally kneaded for a certain amount of time, normally between 6 and 12 minutes, until it forms small balls of the desired consistency, as will be apparent to a skilled cook.

Figure 9:
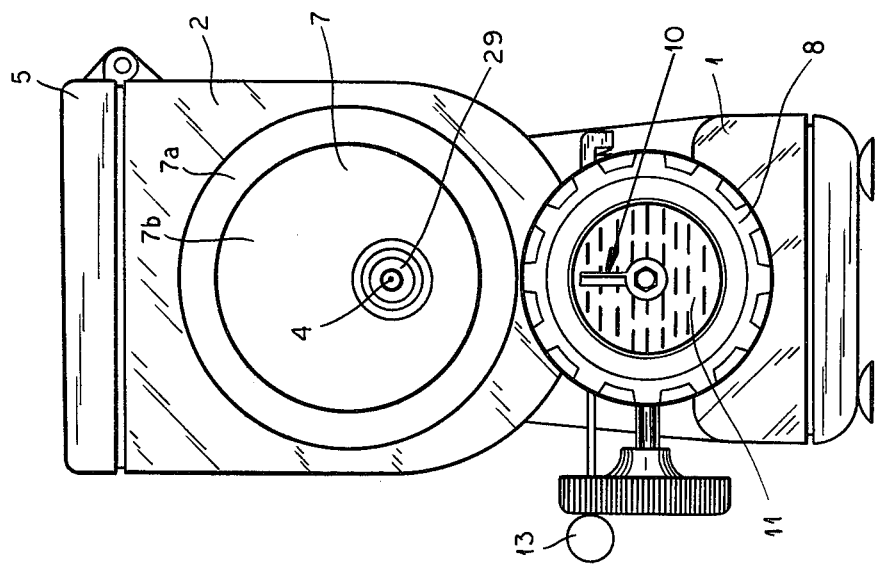
FIG. 9 is a view taken in the direction of arrow IX of FIG. 1.

When the desired consistency has been obtained the knob 12 is rotated to align the notch 12' with the handle 32 and this handle 32 is pulled out to allow the ingredients to flow down into the chamber of the extruder 3. The knob 12 is normally rotated back to hold the gate 13 in this outer open position as shown in FIG. 9.

Subsequently the auger 9 will, in a manner well known in the art, extrude the dough through the apertures of the die 11, and will cut off pieces of the extruded dough by means of the blade 10 to form the desired noodle shape. Operation of the device is extremely simple. The die 11 shown in FIGS. 1, 2, 8, 9, 10A and 10B produces short rectangular noodles of an overall length a, this die 11 being formed with slots 11' and the blade 10 having a single arm attached to its hub 10'.

Figure 10:
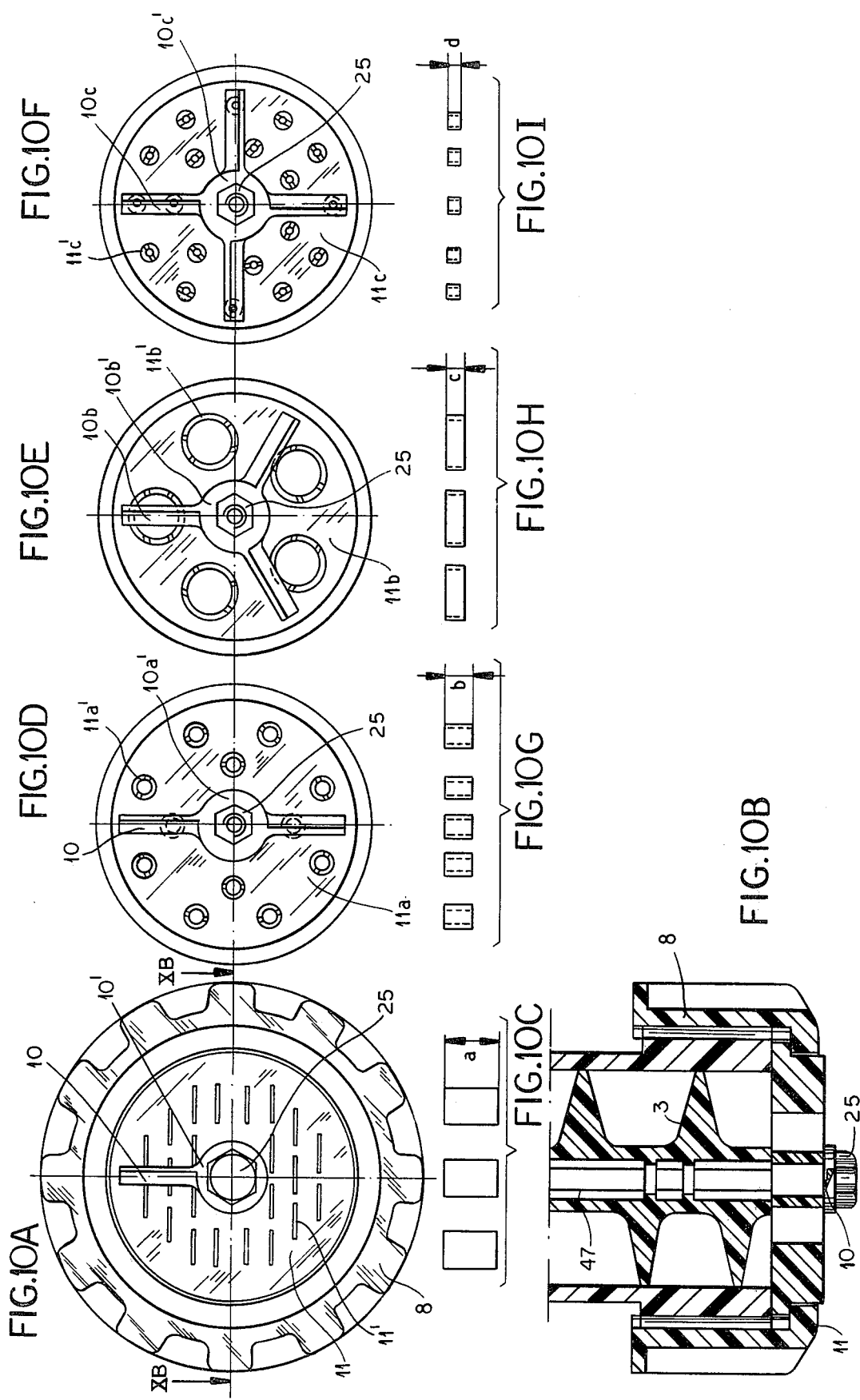
FIG. 10A is a large-scale view of a detail of FIG. 9.
FIG. 10B is a section taken along line XB—XB of FIG. 10.
FIG. 10C is a side view of the pasta produced by the structure shown in FIGS. 10A and 10B.
FIGS. 10D, 10E and 10F are views similar to the details of FIG. 10A showing alternatives of the machine according to this invention.
FIGS. 10G, 10H and 10I show the pasta produced by the structures shown in FIGS. 10D, 10E and 10F, respectively.

FIG. 10D shows a die 11a formed with a multiplicity of small annular holes 11a' that coact with a blade having two arms 10a extending from a hub 10a' to form cylindrical noodles shown in FIG. 10F, which have an overall length b equal to half the length a of FIG. 10C.

A hub 10b' carrying three arms 10b shown in 10E can cooperate with a die 11b having five large annular holes 11b' to form even shorter tubular noodles having an overall length c shown in FIG. 10G.

Even a shorter noodle, having the length d, as shown in FIG. 10I can be produced by a cutter having a hub 10c' from which extend four blades 10c over a die 11c having a multiplicity of small annular holes 11c'. These annular holes 11a', 11b' and 11c' have cores that are supported by short webs adjacent the inner side of the respective dyes so that the pasta flows together and forms annular or tubular noodles as is known in the art.

Figure 11:
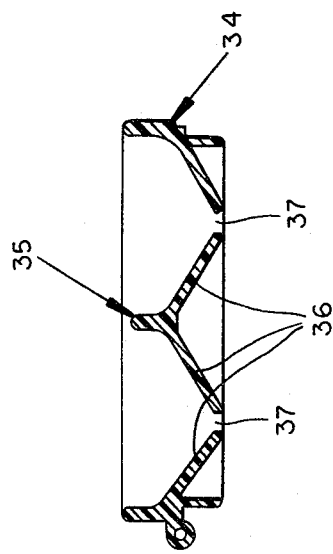
FIG. 11 is a section through an alternative detail of the hopper or the mixer according to this invention.

Finally, FIG. 11 shows another lid 34 which can replace the lid 5, and which has a central ridge 35 and four wall portions 36 defining two downwardly open slots 37. These slots 37, like the slots 46, are too narrow to extend the fingers through, but nonetheless are sufficiently wide to pour ingredients into the hopper 2.

The entire assembly, according to the instant invention can be taken apart relatively easily for cleaning. The rotor can be removed by unscrewing the cover 7, which operation automatically pulls the rotor shaft 4 out of engagement with the output shaft 17 so that this operation, even if carried out during operation of the machine, could not lead to injury of the user. The opening formed by removal of the cover 7, although large enough to allow one to place one's hand inside the hopper 2, would be harmless since removal of the cover 7 also removes the dangerous rotor 4, 4'.

Removal of the screw 25 and nut 8 allows the entire auger assembly to be pulled apart and cleaned. In fact the entire machine can relatively easily be made so easy to disassemble that one need only take it apart after use and soak it briefly to remove all of the dough adhering thereto. Such disassembly also makes the apparatus quite safe since the rotating shafts 17 and 42, even if exposed, are not capable of inflicting any serious harm to a user.

The machine, according to the instant invention, therefore operates relatively easily, but in such a manner that it is almost impossible for the user to hurt himself or herself with it. At the same time the machine can be easily disassembled for cleaning or servicing even by a relatively unskilled person.

I claim:

1. A pasta machine comprising:
   a base formed with an extruder seat;
   a gear transmission in said base and having an input projecting in one direction therefrom, a mixer output exposed in the opposite direction therefrom, and an extruder output also exposed in said opposite direction and provided at said extruder seat;
   an extruder body having an extruder chamber provided internally with an auger element extending along and rotatable about an extruder axis, said body being formed with a window opening radially into said extruder chamber and with an axially open outlet;
   a mixer body having a mixing chamber secured to said extruder body and communicating with said extruder chamber through said window, said mixer body being provided internally with a mixing rotor element extending along and rotatable about a mixer axis generally parallel to said extruder axis, and with a lid engageable over said mixer body and displaceable between an open position giving access to the interior of said mixing chamber and a closed position blocking such access, said lid having a pair of portions substantially closing said mixing chamber in said closed position and defining a narrow slot too narrow to pass a finger through, whereby fluent ingredients can be poured through said slot into said mixing chamber but a user's finger cannot be inserted through said slot into said mixing chamber, said extruder body being releasably interfittable with said extruder seat with said auger element engaged with said extruder output and said mixing element being engaged with said mixer output; and
   means for preventing said lid from moving from said closed into said open position when said extruder body is interfitted with said extruder seat, said means including a lever pivoted at one end on said lid and guided on said mixer body, said mixer body being formed at said mixer axis with a throughgoing hole through which said mixer output engages with said rotor element when said extruder body is fitted to said base, said lever extending across said hole and being formed with a throughgoing hole aligned therewith only in said closed position of said lid.

2. The machine defined in claim 1, further comprising means for securing a pasta-shaping die over said outlet of said extruder body and a blade rotationally mounted on said auger and sweepable over said die to cut pasta issuing therefrom.

3. The machine defined in claim 2 wherein said auger element is provided with an axially extending screw extending through said die and securing said blade to said auger element.

4. The machine defined in claim 1 wherein said lever is L-shaped and has one leg formed with said hole and another leg formed with an elongated slot, said lid being provided with a pivot pin engaging in said slot.

5. The machine defined in claim 1, further comprising a gate between said bodies and formed with an aperture, said gate being displaceable between an open position with said aperture aligned with said window and a closed position with said aperture not aligned with said window and said gate blocking said window.

6. The machine defined in claim 5, further comprising a spring urging said gate into said closed position.

7. The machine defined in claim 6, further comprising means including a rotary knob for locking said bodies to said base, said knob being rotatable through a predetermined angular position for locking and unlocking said bodies, said gate and knob being formed with interengaging formations only permitting said gate to move between said positions in said predetermined angular position of said knob.

8. The machine defined in claim 1 wherein said mixer body includes a removable cover extending generally perpendicular to said axis, said rotor being seated in and axially nondisplaceable relative to said cover.

9. The machine defined in claim 1 wherein said base is generally L-shaped, both of said outputs being generally horizontal and vertically spaced.

10. The machine defined in claim 9 wherein said extruder body is fixed underneath said mixer body and rests atop one leg of said L-shaped base, the other leg being vertical, said outputs projecting from said other leg.

11. The machine defined in claim 1 wherein said rotor includes a rotor shaft extending along said mixer axis and a plurality of arms extending radially from said shaft.

12. The machine defined in claim 1 wherein said portions define a pair of such slots and slope downwardly thereto.

13. The machine defined in claim 3 wherein said bodies are made of a synthetic resin.

14. The machine defined in claim 13 wherein said resin is transparent.

15. The machine defined in claim 1 wherein said extruder and mixer bodies are formed with axially extending interfitting grooves and ridges forming a T-connection and allowing said bodies to be separated from each other.

16. The machine defined in claim 1 wherein said transmission includes gearing for rotating said auger element in a rotational sense opposite to that of said mixer element.

* * * * *